United States Patent
Gilbert et al.

(10) Patent No.: US 9,775,293 B2
(45) Date of Patent: Oct. 3, 2017

(54) HARVEST SWEEPER ATTACHMENT SYSTEM

(71) Applicants: Mark E. Gilbert, Orland, CA (US); Thomas Van Dixon, Chico, CA (US)

(72) Inventors: Mark E. Gilbert, Orland, CA (US); Thomas Van Dixon, Chico, CA (US)

(73) Assignee: Wing Sweep LLC, Orland, CA (US)

( * ) Notice: Subject to any disclaimer, the term of this patent is extended or adjusted under 35 U.S.C. 154(b) by 14 days.

(21) Appl. No.: 15/004,597

(22) Filed: Jan. 22, 2016

(65) Prior Publication Data

US 2016/0212942 A1    Jul. 28, 2016

Related U.S. Application Data

(60) Provisional application No. 62/107,902, filed on Jan. 26, 2015.

(51) Int. Cl.
*A01D 51/00*    (2006.01)

(52) U.S. Cl.
CPC .................................. *A01D 51/002* (2013.01)

(58) Field of Classification Search
CPC ...... A01D 51/00; A01D 51/002; A01D 78/04; A01D 87/02; A01D 87/0015
USPC .................... 56/16.5, 327.1, 328.1
See application file for complete search history.

(56) References Cited

U.S. PATENT DOCUMENTS

| | | | | |
|---|---|---|---|---|
| 3,530,655 A * | 9/1970 | Whitney | ............... | A01D 51/002 56/328.1 |
| 3,591,948 A * | 7/1971 | Brumbaugh | ........... | A01D 51/00 209/137 |
| 3,728,850 A * | 4/1973 | Flory | ..................... | A01D 51/00 56/12.8 |
| 3,762,140 A * | 10/1973 | Block | .................. | A01D 51/002 56/10.4 |
| 3,872,657 A * | 3/1975 | Ramacher | ............ | A01D 51/002 15/84 |
| 4,296,818 A * | 10/1981 | Malinowski | ........... | A01B 43/00 171/144 |
| 4,984,421 A * | 1/1991 | Dreux | .................. | A01D 51/002 56/328.1 |
| 5,001,893 A * | 3/1991 | Stanley | ................ | A01D 51/002 56/16.5 |
| 5,465,562 A * | 11/1995 | Croft | ..................... | A01D 51/002 56/16.4 R |
| 6,988,353 B2 * | 1/2006 | Bertino | .................. | A01D 87/02 56/328.1 |

(Continued)

*Primary Examiner* — Robert Pezzuto
(74) *Attorney, Agent, or Firm* — Michael J. Hughes

(57) ABSTRACT

A harvest sweeper attachment system (10) is provided for attaching to a harvester machine (12) having a collection aperture (14), for use in propelling desired objects (11), such as nuts, toward the collection aperture (14). The system (10) preferably has two sweep units (20) mounted on each side of the harvester machine (12) at a forward angle, each including a rotating rake subassembly assembly (34). The rake subassembly (34) is characterized by having three axially spaced freely rotating tine bars (88), each having a depending array of tines (90), mounted between a proximal rake plate (74) and a distal rake plate (76). The proximal and distal rake plates (74, 76) are mounted at about a forty-five degree angle such that the rake subassembly (34) has an offset parallelogram aspect.

15 Claims, 4 Drawing Sheets

(56) References Cited

U.S. PATENT DOCUMENTS 7,131,254 B2 * 11/2006 Flora ............... A01D 51/002
 56/13.1
7,412,817 B2 * 8/2008 Flora ............... A01D 51/002
 56/328.1

* cited by examiner

HARVEST SWEEPER ATTACHMENT SYSTEM

This is a non-provisional application, claiming priority from U.S. provisional application No. 62/107,902 by the same inventors, filed 26 Jan. 2015.

TECHNICAL FIELD

The present invention relates generally to agricultural implements and particularly to harvesting units adapted for harvesting loose crops, such as nuts, from ground surfaces.

BACKGROUND ART

Like nearly all other areas of knowledge and commerce, the field of agriculture is subject to continual improvements in techniques and related equipment. This is certainly the case in harvesting implements, where the scythe, rake and pitchfork have gradually given way to increasingly automated methods of picking up and collecting crop elements.

One are of harvesting relates to concentrating the desired crop objects into convenient locations in order to facilitate collection in another step. By concentrating the desired objects, more compact collection equipment may be utilized, with a consequent savings in energy, machinery costs and efficiency.

Some crops, most particularly nuts, are typically harvested by shaking or otherwise dislodging the nut components from the trees such that they are then lying on the ground. Harvesting machines of various types then cover the ground area and collect the nuts for transport and further processing. Auxiliary "concentrators" may be used with these machines in order to collect from a wider swath of ground and to concentrate the objects into a narrower zone for more efficient pick up.

Various prior art attempts to provide harvesting concentrators have been used over time, with many specifically relating to nut harvesting. Numerous US patents have been granted for nut harvesting equipment and various commercial adaptations of concentrators have been used in the fields. However, all have had drawbacks in efficiency of collection, complexity and/or durability.

Accordingly, there is significant room for improvement and a need for better implements for concentrating and directing loose crops, particularly nuts, into collection equipment.

DISCLOSURE OF INVENTION

Accordingly, it is an object of the present invention to provide a harvest sweeper (concentrator) which significantly and efficiently broadens the lateral scope of a single pass of the harvester through a row.

Another object of the invention is to provide a harvest sweeper which concentrates an extremely high percentage of the available harvest objects (nuts) and directs them to the harvester pick-up aperture.

A further object of the present invention is to minimize stragglers or uncollected objects.

Yet another object of the invention is to provide a dual sided attachment sweeper which may be mounted on a wide variety of harvester machines.

A further object of the present invention is to provide a concentrator device which is economical, safe, easily installed, height adjustable, and relatively light-weight.

Still another object of the invention is to provide a farmer-installable accessory to greatly improve harvesting efficiency.

Briefly, one preferred embodiment of the present invention is a harvest sweeper including a symmetrical pair of sweep head units, a left sweep head and a right sweep head, extending forward and laterally from the collection aperture of a harvesting machine. Each sweep includes a rotational rake assembly with, in the preferred embodiment, three distinct sweep rods, each supporting hanging closely spaced flexible tine elements. Each rake assembly is mounted at a forty-five degree angle from vertical to have a generally offset parallelogram shape when viewed from the front or rear and includes an opposing pair of triangular end rotor plates which are supported on rotational bearings on a sweeper frame.

An advantage of the present invention is that it provides an accessory to a wide variety of harvesting machines which is easily installable and removable, and thus permits operation on a variety of machines and locations during the harvest season.

Yet another advantage of the present invention is that the angle of mounting, both of the sweep units themselves and of the rake subassemblies in each unit, works to optimize propulsion of the objects/nuts inward toward the collection scoop of the harvester upon which the invention is mounted.

A further advantage of the present invention is that the riser plates mounted on each tine bar minimize the potential for nuts escaping propulsion by hopping over the rake.

Still another advantage of the harvest sweeper system of the present invention is that it will operate effectively with both standalone and tractor driven harvesting machines.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

The present invention is a harvesting sweeper 10 implement particularly adapted for directing and concentrating loose objects 11, such as nuts. The harvesting sweeper 10 is an add-on attachment adapted to be used with any of a variety of harvester machines 12 adapted to actually pick up and process or store the objects 11 directed to them by the sweeper 10.

Figure 1:
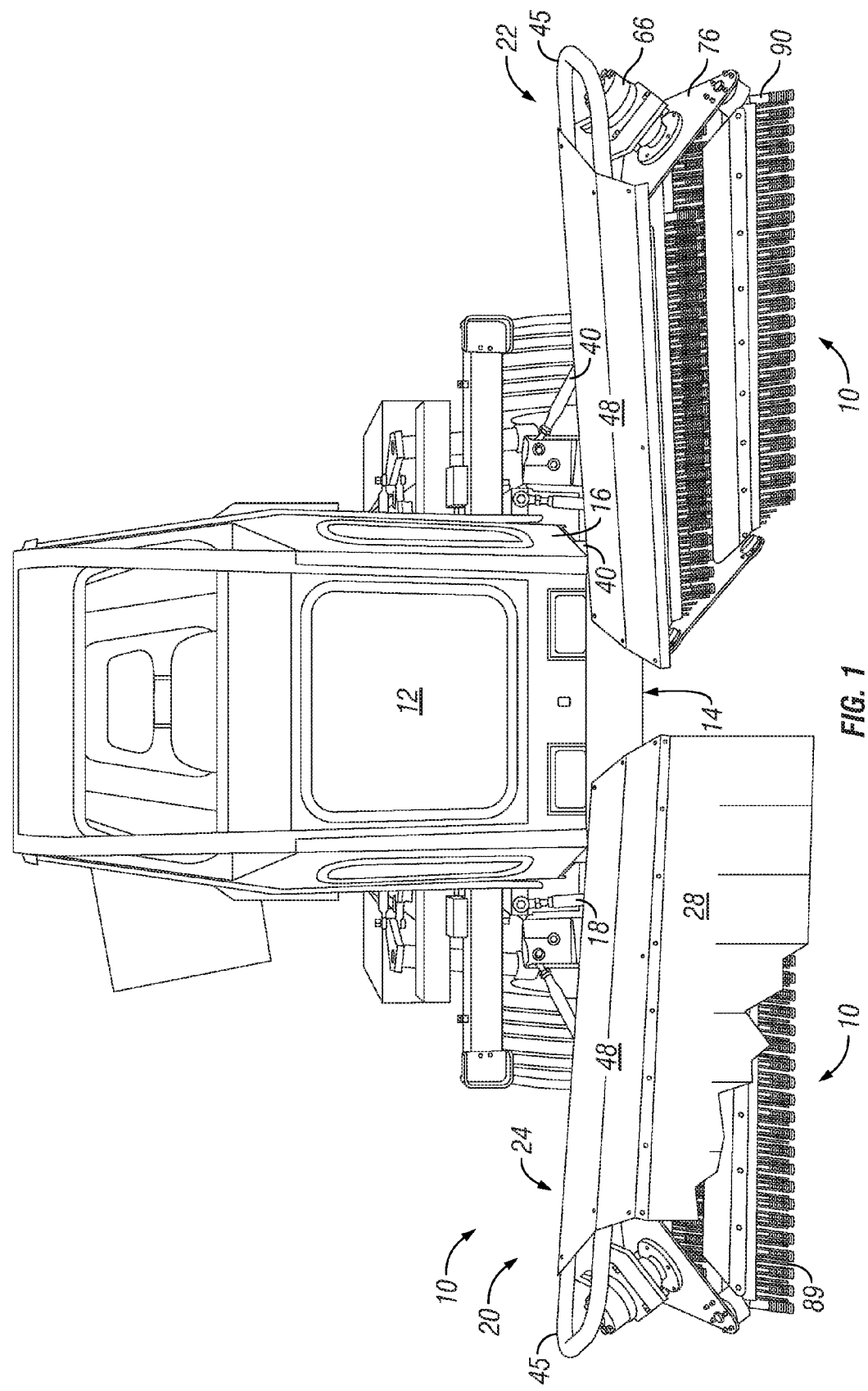
FIG. 1 is a perspective view of a harvest sweeper system according to the present invention, shown as installed upon a nut harvesting machine.

A typical nut harvester machine 12, equipped with the inventive sweeper system 10, is shown in a perspective view of FIG. 1. The harvester machine 12 is shown to have, as relevant components for the purposes of the invention: a collection scoop/aperture 14; a harvester frame 16; and hydraulic connectors 18. Other features of the harvester machine 12 are not directly interacting with the inventive sweeper 10 and are thus not specifically identified.

Figure 2:
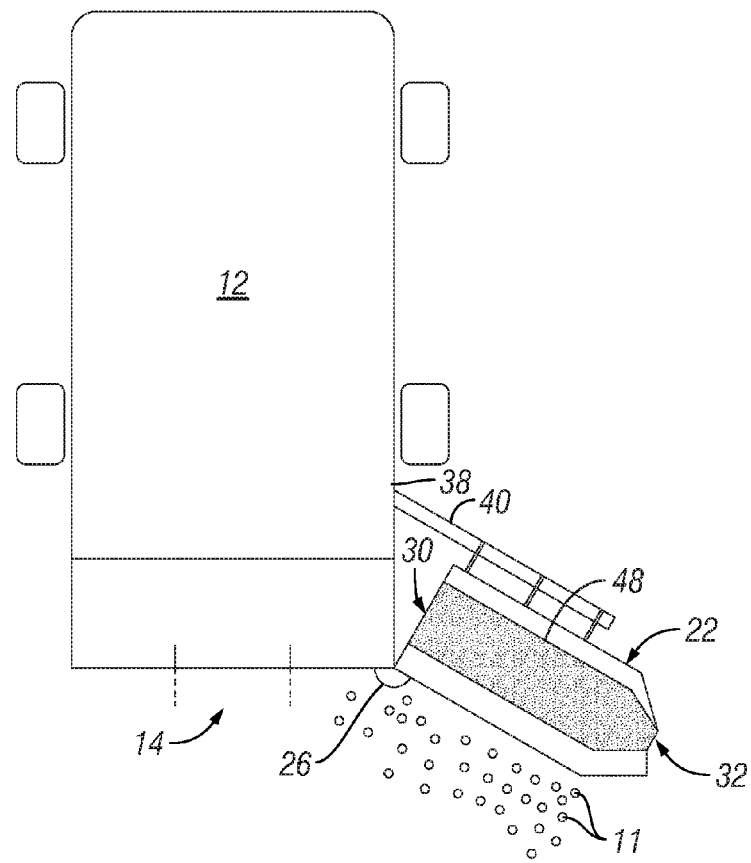
FIG. 2 is a fanciful top view of a harvester unit and a right front seep unit according to the invention.
Figure 5:
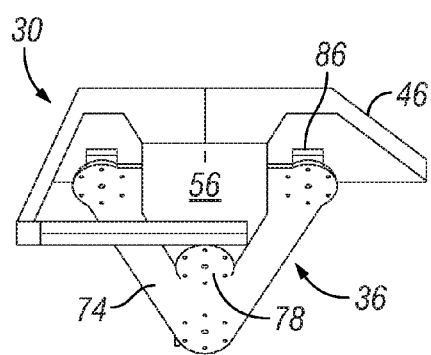
FIG. 5 is a proximal end plan view of a sweep unit, including the hood.
Figure 6:
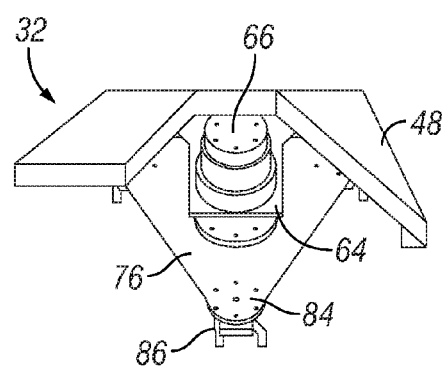
FIG. 6 is a distal end plan view of the sweep unit of FIG. 5.

As shown in FIG. 1 the harvest sweeper system 10 includes two separate but symmetrical sweep head units 20, being a left sweep head 22 and a right sweep head 24 (all conventionally referred to herein as "sweeps"), mounted forward of and to each side of the collection scoop 14 at a desired mounting angle 26. The inventors believe that the best mounting angle 26 for almond harvesting is about thirty degrees forward of vertical, as illustrated in FIG. 2. The right sweep 24 is effectively a mirror image of the left sweep 22, with the same component elements. Each sweep unit 20 is mechanically mounted to the harvester frame 16 and connected to a hydraulic connector 18.

Each sweep unit 20, as shown in FIG. 1 only, includes a flexible front curtain 28 extending toward the front, the front curtain 28 extending to a short distance above the ground such that the objects 11 can pass underneath the curtain 28.

Referring now particularly to FIGS. 3-6, the details of the sweep units 20 are shown in more detail. As seen, each sweep unit 20 has proximal end 30 adjacent to, or aligned in front of, the harvester frame 16 and a distal end 32 extending outwardly and forwardly therefrom. Each sweep unit 20 includes a structural subassembly 34 and a rake subassembly 36.

The structural subassembly 34 includes a sweep frame 38 and a mounting bracket 40 at the proximal end 30 for engaging with the harvester frame 16 to suspend the sweep unit 20 above the ground. An optional toe wheel 42 may be provided in some embodiments extending from the rear side of the sweep frame 38 (see FIG. 1) to provide vertical and rolling support. In deluxe embodiments, the entire sweep unit 20 is cantilevered from the harvester machine 12, preferably hinged to rotate upward, and no toe wheel 42 is required.

Figure 3:
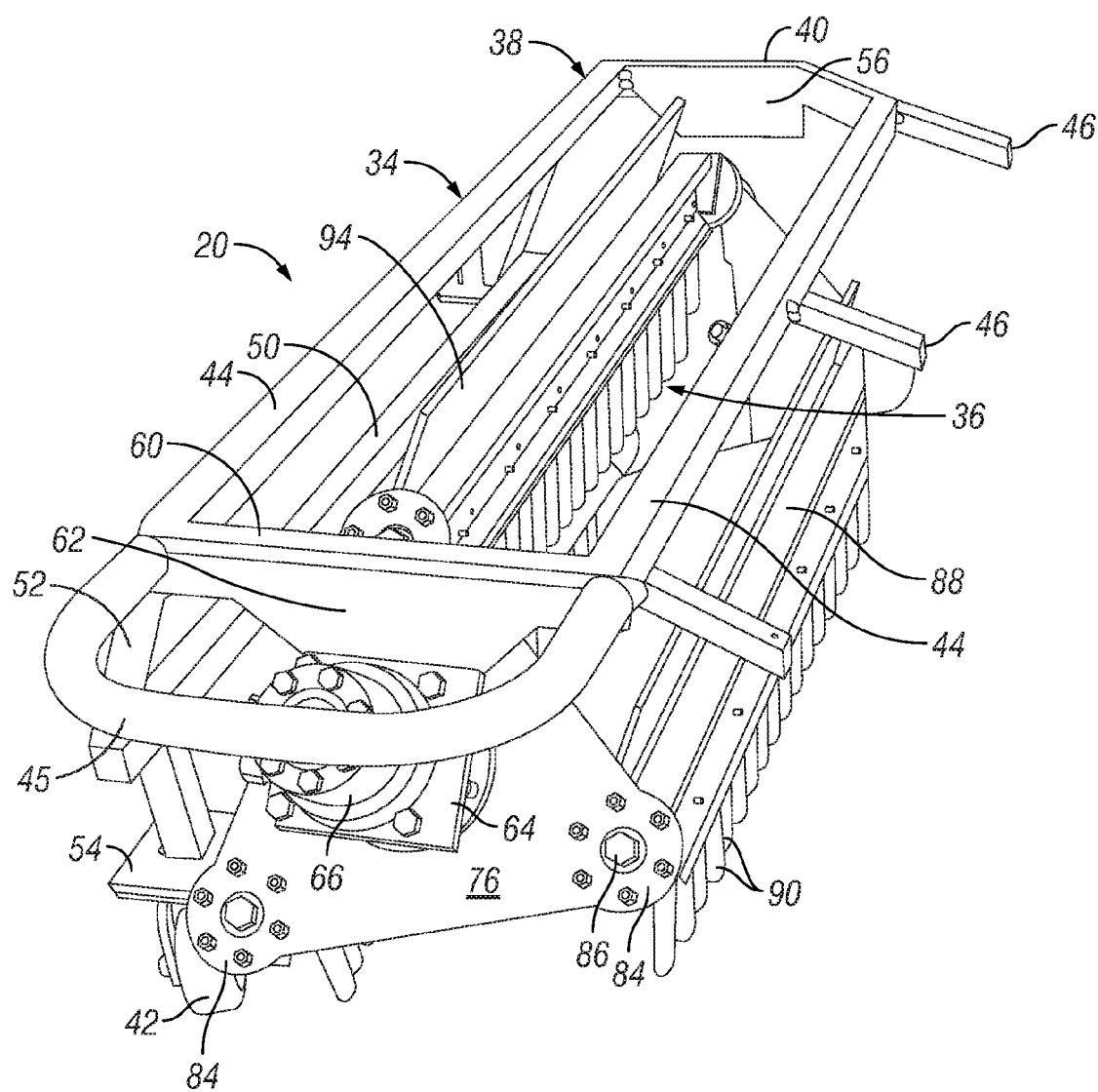
FIG. 3 is a is a distal end perspective view of a left sweep unit.
Figure 4:
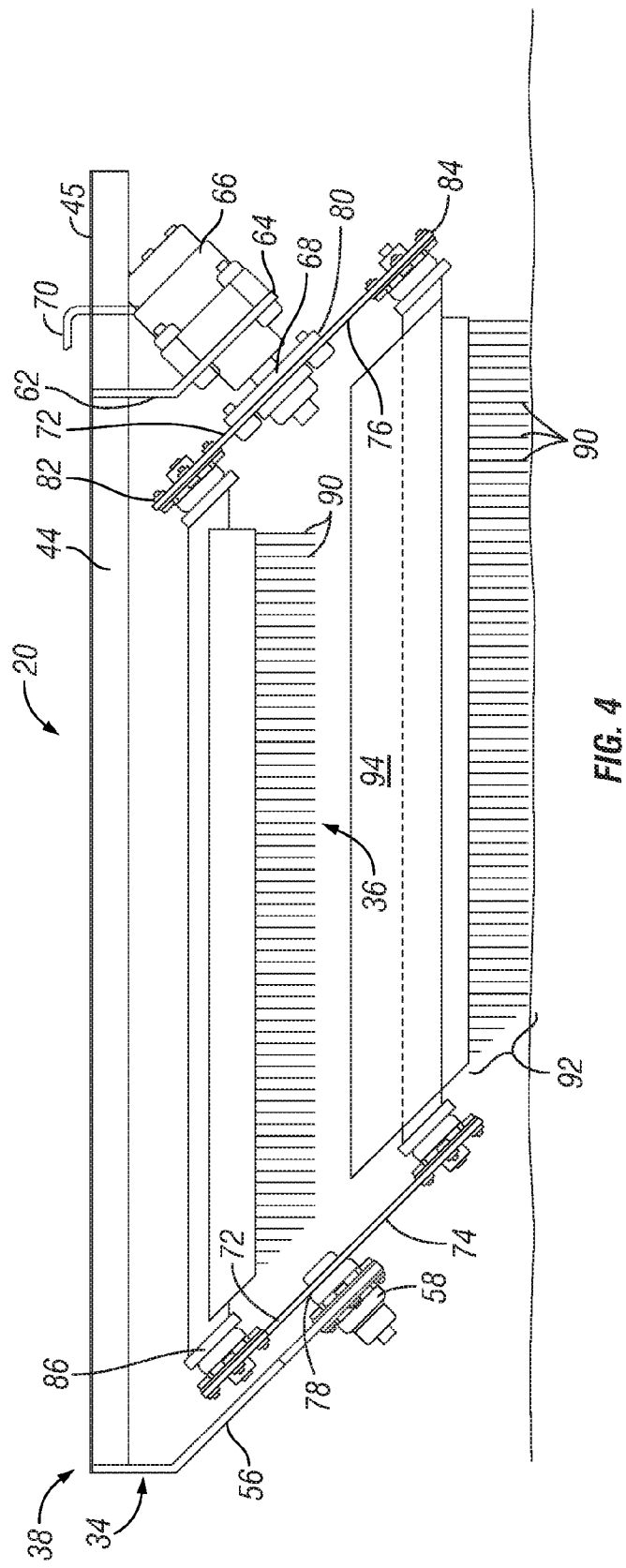
FIG. 4 is a cut-away front view of a sweep unit, taken along.

The sweep frame 38, best illustrated in FIG. 3, primarily includes an elongated hollow upper frame 44 member, terminating at the distal end 32 with a motor guard 45, with multiple angle brackets 46 extending at a downward angle from the front to support a hood 48 extending above the sweep unit 20 (see FIG. 1) to protect the rake subassembly 36 from fouling by undesired outside objects. The front curtain 28 hangs from the front edge of the hood 48. A rear longitudinal bar 50, connected to the upper tube 44 by depending struts 52 also supports the hood 48 and the optional toe wheel mount 54 (or stand plate) and adds further structural integrity.

A trapezoidal proximal hanging plate 56 including a rotational support bearing 58 depends at a forty-five degree (45°) angle from the proximal end 30 of the upper frame 44, to engage and support the proximal end of the rake subassembly 36. A cross bar 60 extends across at the distal end of the upper frame 44, interior to the motor guard 45. A trapezoidal distal hanging plate 62 depends directly downward from the cross bar 60. The distal hanging plate 62 in turn supports a motor mount plate 64 at a forty-five degree angle, with the motor mount plate 64 including a hydraulic motor 66 with a drive shaft 68 (or hub) for engaging and supporting the distal end of the rake subassembly 36. A hydraulic tube 70 extends from the hydraulic motor 66 along the upper frame to interface with the hydraulic line 18 on the harvester machine 12 and to consequently provide power to the hydraulic motor 66 and the rake subassembly 36.

With the exception of the inner portion of the second rotational support bearings 58 and the drive shaft 68, all of the components of the structural subassembly 34 are stationary with respect to the harvester machine 12 (except when levered upward out of operational position as set forth below).

It is envisioned that the mounting of each sweeper unit 20 to the harvesting machine 12 in deluxe embodiments may be pivotal such that the sweeper units 20 may be vertically pivoted upward (manually or hydraulically) out of the way to facilitate passage through narrower pathways.

Each rake subassembly 36 has similar rake rotor plates 72 is mounted on the structural subassembly 34 at each end. The rotational support bearing 58 mates with a proximal rake rotor plate 74 at the interior end and the drive shaft 68 mates with a distal rake rotor plate 76 at the outer end. As seen particularly in FIGS. 3, 5 and 6, the rake rotor plates 72 are generally triangular in shape, each mounted at a forty-five degree (45°) angle with respect to vertical with the upper extents of the rake plates 72 being angled in toward the harvester machine 12. It is noted that, to provide for a horizontal alignment of the rake subassembly 36, the distal rake rotor plate 76 is mounted significantly higher from the ground, and closer to the upper tube, than the proximal rake rotor plate 74.

Each rake plate 72 is trilaterally symmetrical about a center hole 78. The center hole 78 of the proximal rake plate 74 mates from above the proximal hanging plate 56, with the rotational support bearing 58 on the proximal hanging plate 56 engaging the center hole 78, while the respective center hole 78 of the distal rake plate 76 hangs below and mates with drive shaft/hub 68 depending from the hydraulic motor 66 mounted on the motor mount plate 64. Both connections are buttressed by strong securing plates 80 secured by fasteners 82 (bolts and nuts in the preferred embodiment) to provide stable mounting and vertical support to the rake subassembly 36.

Each rake rotor plate 72 has three apex tips 84, with a spin bearing 86 situated centered in each one. A tine bar 88 is pivotally attached to each spin bearing 86 (three substantially identical tine bars 88 in all). At the front edge of each tine bar 88 is mounted an array of rigid pins 89 which act to propel larger objects away. The rigid pins 89 are relatively short and only engage items, such as larger clods of dirt, branches, or rocks, which extend significantly above the ground surface. That is, the rigid pins 89 will ordinarily only interact with items larger than the desired objects 11. A plurality of tines 90 hang below each tine bar 88 rearward of the rigid pins 89, the tines 90 being arrayed in a row extending all the way between rake plates 72. The flexible times 90 are adapted to engage and propel the desired objects 11. The pivotal attachment to the spin bearings 86 and the free rotation of the tine bar 88, combined with the weight of the tines 90, maintains the "tines down" alignment throughout the rotation of the rake subassembly 36. The tines 90 are flexible (usually rubber with metal reinforcement) and relatively massive. The tines 90 on each tine bar 88 are closely spaced and are adapted to brush along the ground in use to propel the desired objects 11 forward of the rake subassembly 36 and inward toward the collection aperture 14.

At the proximal end of each tine bar 88, a series of graduated proximal tines 92 having decreasing length are provided (see FIG. 4), both to urge slightly airborne objects 11 into the collection aperture 14 and to avoid brushing against the upper portions of the proximal rake rotor plate 74 during rotation.

Each tine bar 88 is further provided with a riser plate 94 extending across the entire length. The riser plate 94 prevents carryover of the nuts or other objects 11 to the rear of the sweeper unit 20.

The use of three tine bars 88 arranged in an equilateral triangle fashion in each rake subassembly 36 provides optimal ground coverage during harvesting. The delay factor in the rotation causes each set of tines 90 to sweep each patch of ground sequentially such that no nuts are missed in the operation. The equilateral array increases structural integrity and the fort-five degree offset mounting maximizes ground coverage and object propulsion.

Since the object of the sweeper 10 is to drive objects 11 forward and inward to where they are in the cone of reception for the collection scoop 14, the rake subassemblies 36 rotate in such a fashion that the tines 90 accomplish this purpose. This means that, from the viewpoint of the hydraulic motors 66 (the distal end 32 of each sweep unit 20) the right sweep 22 has a clockwise rotation while the left sweep 24 has a counterclockwise rotation. In the preferred embodiment 10 the hydraulic motors 66 are intended to drive the rake subassemblies as the same rotational speed, but potential embodiments may utilize differential rotation.

The materials selected for the components of the sweeper units 20 are structurally strong but lightweight. Consequently, most structural elements are tubular and constructed of steel or aluminum. The tines 90 are typically metal-reinforced rubber or flexible composite materials which are durable, but have enough heft to effectively drive the nuts/objects 11 forward without allowing any to pass through the tine array, while flexible enough to avoid being fouled or broken by embedded rocks, significant branch segments, or the like.

Many modifications to the above embodiment may be made without altering the nature of the invention. The dimensions and shapes of the components and the construction materials may be modified for particular circumstances.

While various embodiments have been described above, it should be understood that they have been presented by way of example only, and not as limitations.

INDUSTRIAL APPLICABILITY

The harvest sweeper subsystem 10 according to the present invention is adapted to be an accessory which greatly enhances the effectiveness of harvesting machines, particularly those used in harvesting nuts or non-bruiseable fruits which are on the ground in orchards (usually after having been shaken form the trees when ripe).

The unique trilateral angled mounting and structure of the rake subassemblies 36 in each sweeper unit 20 significantly enhance object (nut) capture by the harvesting machine 12. The timing, angle, and vertical positioning of the tine bars and the spacing, heft and flexibility of the tines 90 improve efficiency of capture of the loose nuts 11 on the ground. The relatively lightweight overall construction and the ease of installation of the sweep units 20 save time and effort on the part of the rancher/harvester. Hydraulic control from the harvesting machine 12 (operable by the driver) allows flexibility and minimizes issues with breakage and collection efficiency.

Greater effectiveness in harvesting results in significant economic advantages. In addition, lightweight construction can lessen material costs and/or simplify and optimize assembly and disassembly. The farmer/rancher can ordinarily install and remove the sweeper units 20 without specialized tools or professional expertise. The sweeper units 20 are durable and adaptable for use on a great variety of harvesting machines 12 and over several seasons.

For the above, and other, reasons, it is expected that harvest sweeper subsystem 10 according to the present invention will have widespread industrial and agricultural applicability. Therefore, it is expected that the commercial utility of the present invention will be extensive and long lasting.

What is claimed is:

1. A harvest sweeper attachment system for directing objects to be harvested, comprising:
    at least one sweep head unit for attachment at a forward angle to a harvester machine having a collection aperture;
    each said sweep head unit including a sweep frame and a rake subassembly, said rake assembly being adapted to rotate within said sweep frame;
    wherein said rake subassembly includes three trilaterally arrayed tine bars from which depend a lateral array of tines for driving objects forward and inward during rotation so as to be eventually captured by said collection aperture; and,
    each said tine bar is pivotally attached at each end to a rake rotor plate, each said rake rotor plate being angled at about forty-five degrees from vertical.

2. The harvest sweeper attachment of claim 1, wherein each said rake rotor plate is connected to a variable speed motor for rotating said tine bars.

3. The harvest sweeper attachment of claim 1, wherein a left sweep head unit and a right sweep head unit are provided, extending symmetrically outward from each side of said collection aperture.

4. The harvest sweeper attachment of claim 3, wherein each said sweep head unit is angled forward at about a forty-five degree angle with a proximal end nearest said collection aperture and a distal end furthest from and forward of said collection aperture.

5. The harvest sweeper attachment of claim 3, wherein said rake subassemblies on each sweep head unit are mechanically rotated such that said tines extend perpendicularly toward the ground so as to encounter and propel desired objects on the ground surface forward and inward toward said collection aperture.

6. The harvest sweeper attachment of claim 4, wherein each said rake subassembly is rotated by a motor situated near said distal end of said sweep head unit.

7. The harvest sweeper attachment of claim 1, wherein each said tine bar is free to rotate on its own axis such that said lateral array of tines continually depends downward toward the ground surface during rotation, while said tines make minimal contact with the ground at their lowest extent.

8. The harvest sweeper attachment of claim 7, wherein said lateral array of tines includes a plurality of individually mounted tines depending from a respective one of said tine bars, each said tine having length and heft sufficient to propel desired objects forward.

9. A sweep head unit adapted for mounting on a harvester unit having a collection aperture, said sweep head unit comprising;

an elongated sweep frame, having a proximal end and a distal end, attached at its proximal end to the harvester unit and extending outward and forward to said distal end; and a rake subassembly rotatably depending within and below said sweep frame; wherein said rake subassembly includes a proximal rake plate and a distal rake plate, each mounted on a rotational support bearing secured to said sweep frame said rake subassembly includes three equally axially spaced tine bars freely rotatably mounted between said proximal rake plate and said distal rake plate, each said tine bar having a plurality of tines depending therefrom; and said rake subassembly includes three equally axially spaced tine bars freely rotatably mounted between said proximal rake plate and said distal rake plate, each said tine bar having a plurality of tines depending therefrom, said tine bars being freely rotationally connected to respective rotor plates at the proximal and distal ends of said rake assembly, said rotor plates being offset at approximately forty-five degrees from vertical; and said rake subassembly is caused to rotate with respect to said sweep frame in use such that said tines of each said tine bar the collection aperture sequentially impact and propel desired objects on a surface forward and inward toward said collection aperture.

10. The sweep head unit according to claim 9, and further including a variable speed motor unit secured to said sweep frame and having a drive shaft secured to said distal rake plate so as to rotate said rake subassembly.

11. The sweep head unit according to claim 9, wherein said proximal rake plate and said distal rake plate are aligned parallel to each other, are trilaterally symmetrical, and include apex points, each said apex point having a spin bearing for receiving a respective one of said tine bars.

12. The sweep head unit according to claim 9, wherein each said tine is a resilient material having a heft and extent sufficient to drive the desired objects upon impact.

13. The sweep head unit according to claim 9, wherein each said tine bar further includes a riser plate arrayed generally opposite said tines.

14. The sweep head unit according to claim 9, wherein said sweep frame includes: a mounting bracket at its distal end for attaching to the harvester unit, an encompassing upper tube; a motor guard, and brackets for supporting said rake subassembly.

15. The sweep head unit according to claim 14, wherein said sweep frame further supports a hood.

\* \* \* \* \*